(12) United States Patent
Clemence et al.

(10) Patent No.: US 11,086,009 B2
(45) Date of Patent: Aug. 10, 2021

(54) IMAGING DEVICE AND CORRESPONDING IMAGING METHOD

(71) Applicant: MICROWAVE CHARACTERIZATION CENTER, Sainghin-en-Melantois (FR)

(72) Inventors: Florent Clemence, Villeneuve d'Ascq (FR); Nicolas Thouvenin, Faches-Thumesnil (FR); Matthieu Werquin, Lesquin (FR); Sylvain Jonniau, Croix (FR); Nicolas Vellas, Richebourg (FR)

(73) Assignee: Microwave Characterization Center, Sainghin-en-Melantois (FR)

( * ) Notice: Subject to any disclaimer, the term of this patent is extended or adjusted under 35 U.S.C. 154(b) by 327 days.

(21) Appl. No.: 15/563,651

(22) PCT Filed: Mar. 25, 2016

(86) PCT No.: PCT/FR2016/050682
§ 371 (c)(1),
(2) Date: Oct. 2, 2017

(87) PCT Pub. No.: WO2016/156717
PCT Pub. Date: Oct. 6, 2016

(65) Prior Publication Data
US 2018/0074190 A1 Mar. 15, 2018

(30) Foreign Application Priority Data
Apr. 2, 2015 (FR) ...................................... 1552860

(51) Int. Cl.
*G01S 13/88* (2006.01)
*H01Q 3/20* (2006.01)
(Continued)

(52) U.S. Cl.
CPC ............ *G01S 13/887* (2013.01); *G01S 7/032* (2013.01); *G01S 7/4021* (2013.01);
(Continued)

(58) Field of Classification Search
CPC ...... G01S 13/887; G01S 7/032; G01S 7/4021; G01S 13/426; G01S 13/89
(Continued)

(56) References Cited

U.S. PATENT DOCUMENTS 6,157,018 A * 12/2000 Ishiguro ................ G02B 13/06
250/208.1
6,396,448 B1 * 5/2002 Zimmerman ............ H01Q 3/14
343/753
(Continued)

FOREIGN PATENT DOCUMENTS

CN 101641612 2/2010
CN 103813108 5/2014
(Continued)

OTHER PUBLICATIONS

Russian Search Report dated Apr. 10, 2019 (Apr. 10, 2019), 2 pages.
(Continued)

*Primary Examiner* — Bo Fan
(74) *Attorney, Agent, or Firm* — Fay Sharpe LLP

(57) ABSTRACT

The present invention relates to an imaging device (1) comprising:
a first microwave sensor or set of microwave sensors (2), preferably radiometric sensors, each microwave sensor (2) being configured to pick up electromagnetic radiation emitted or reflected by bodies or objects situated in a detection zone of said microwave sensor (2); and
reflector means (6) configured to reflect the electromagnetic radiation that can be picked up by the first microwave sensor or the set of microwave sensors (2).

(Continued)

In particular, the reflector means (6) are mounted to move in the detection zone of each microwave sensor (2) in such a manner as to move said detection zone by moving the reflector means (6). The invention also provides a corresponding microwave imaging method.

17 Claims, 3 Drawing Sheets

(51) Int. Cl.
| | | |
|---|---|---|
| *H01Q 19/06* | (2006.01) | |
| *G01S 13/89* | (2006.01) | |
| *G01S 7/40* | (2006.01) | |
| *G01S 13/42* | (2006.01) | |
| *G01S 7/03* | (2006.01) | |
| *G01V 8/00* | (2006.01) | |
| *H01Q 3/14* | (2006.01) | |
| *H01Q 3/16* | (2006.01) | |

(52) U.S. Cl.
CPC ............ *G01S 13/426* (2013.01); *G01S 13/89* (2013.01); *G01V 8/005* (2013.01); *H01Q 3/14* (2013.01); *H01Q 3/16* (2013.01); *H01Q 3/20* (2013.01); *H01Q 19/062* (2013.01)

(58) Field of Classification Search
USPC ......................................................... 342/179
See application file for complete search history.

(56) References Cited

U.S. PATENT DOCUMENTS

| | | | | |
|---|---|---|---|---|
| 2002/0044276 A1* | 4/2002 | Stoner | ................... | G01B 15/00 |
| | | | | 356/141.1 |
| 2003/0164790 A1* | 9/2003 | Kurita | ................... | G01S 7/4021 |
| | | | | 342/28 |
| 2004/0149907 A1* | 8/2004 | Vaidya | ..................... | H04N 5/30 |
| | | | | 250/336.1 |
| 2010/0104193 A1* | 4/2010 | Takeda | ...................... | G01S 7/03 |
| | | | | 382/195 |
| 2012/0085909 A1* | 4/2012 | Chen | .................... | G01K 11/006 |
| | | | | 250/338.1 |
| 2013/0093611 A1* | 4/2013 | Crowley | ............... | G01S 7/4026 |
| | | | | 342/22 |

FOREIGN PATENT DOCUMENTS

| | | |
|---|---|---|
| CN | 103858021 | 6/2014 |
| CN | 104303073 | 1/2015 |
| RU | 2530015 C2 | 10/2014 |

OTHER PUBLICATIONS

Chinese Patent Office Examination Report for Chinese Patent Application corresponding to U.S. Appl. No. 15/563,651, dated Feb. 25, 2020.

* cited by examiner

IMAGING DEVICE AND CORRESPONDING IMAGING METHOD

BACKGROUND OF THE DISCLOSURE

The present disclosure relates to an imaging device and to a corresponding imaging method. The present disclosure relates in particular to microwave imaging, and in particular to radiometric imaging.

A particular object of the disclosure is to enable objects that have been hidden, in particular by people, to be detected automatically and in a manner that is reliable, fast, and easy. Such detection can be used in particular in airport security checkpoints, military sites, or indeed sensitive sites that may require security searching, e.g. prisons, nuclear power stations, etc.

Security requirements have increased with increasing risk, in particular of terrorist attacks. Various detection systems have thus been developed or are under development in order to respond to such requirements. In particular, there exist active systems, e.g. airport scanners, that make use of radiometry in order to detect any kind of object (whether made of metal or otherwise) carried by passengers, in particular under clothing, with a resolution of less than 1 centimeter (cm). One of the purposes of such systems is specifically to obtain an image of high quality, e.g. with a large number of pixels so as to enable the results to be used easily.

In the visible range, it is presently common practice to use charge coupled device (CCD) type sensors to make an image of a scene. Such sensors comprise matrices of several million photodiodes suitable for recording an image in the visible range made up of several million pixels (where one pixel generally requires four photodiodes that are associated with filters of different colors). It is thus possible to take an image in the visible range by recording the signal received by each photodiode at the image-taking instant. Furthermore, the photodiodes used are small, of the order of 1.5 micrometers ($\mu$m), and they consume little energy. It is thus possible with such sensors to take an image quickly using a camera that is compact and that consumes little energy.

Nevertheless, in the microwave range, and in particular in the radiometric range, existing sensors do not enable such characteristics to be obtained. Firstly, for physical reasons, radiometric sensors cannot present a size that is smaller than the wavelength to be detected, which is of millimeter order: radiometric sensors thus present a size that is greater than one millimeter, which implies that they occupy a large amount of space when it is envisaged to use a matrix of several thousand sensors. Furthermore, microwave sensors still remain very expensive and they consume energy. Thus, for these various reasons, it is not presently envisaged to fabricate radiometric imaging devices similar to devices for taking images in the visible range with a number of sensors equal to the number of pixels in the images supplied by the device.

In order to mitigate that drawback, it is known to make use of devices that comprise sensors associated with a scanner system enabling a person to be scanned completely in a minimum length of time and at short range. Such devices thus make it possible to take images at distances of less than 1 meter (m).

Nevertheless, such devices require a structure that is relatively complex, in order to move the sensors along the scene that is to be measured: this involves constraints for the person being measured by the device, such as keeping still. Furthermore, such devices also require more time in order to supply a complete image of the scene, in particular because the sensors cannot be moved very quickly, given their immediate proximity with the person being measured. Finally, the number of sensors present can remain large, in particular in order to limit the time taken to perform the measurement, which leads to a device that is expensive and that consumes a large amount of energy.

OBJECT AND SUMMARY OF THE DISCLOSURE

The present disclosure seeks to solve the various technical problems set out above. In particular, the present disclosure seeks to propose a microwave imaging device that enables a given scene to be scanned quickly, i.e. that can supply an image having a larger number of pixels rapidly, while nevertheless having a limited number of microwave sensors. The present disclosure also seeks to propose an imaging device in which the microwave sensors are calibrated in a manner that is accurate and periodic.

The present disclosure seeks to propose a device enabling one or more scenes to be scanned rapidly, and to supply reliable and accurate images thereof.

Thus, in one aspect, there is provided an imaging device comprising:
 a first microwave sensor or set of microwave sensors, for example radiometric sensors, each microwave sensor being configured to pick up electromagnetic radiation emitted or reflected by bodies or objects situated in a detection zone of said microwave sensor; and
 reflector means configured to reflect the electromagnetic radiation that can be picked up by the first microwave sensor or the set of microwave sensors.

In particular, the reflector means are mounted to move in the detection zone of each microwave sensor in such a manner as to move said detection zone by moving the reflector means.

Thus, the reflector means enable the detection zone of the sensors to be steered freely in order to measure some other portion of the scene that is to be measured. The scene that is to be measured (objects or people) is thus scanned by moving the reflector means, thereby limiting firstly the number of microwave sensors, and secondly the structure of the scanner (only the reflector means are moved, not the sensors).

The term "microwave" sensor, and in particular a radiometric sensor is used herein to mean a sensor capable of measuring electromagnetic frequencies lying in the range $10^7$ hertz (Hz) to $10^{14}$ Hz, and for example, in the range $10^9$ Hz to $10^{13}$ Hz.

The microwave sensor(s) may be radiometric sensors.

The imaging device may comprise focusing means mounted in the detection zone of each microwave sensor and enabling the electromagnetic radiation from a measurement zone to be focused on each microwave sensor, and the reflector means are positioned between the focusing means and the measurement zone of each microwave sensor.

Thus, the reflector means serve to scan the scene that is to be measured with the detection zone of the microwave sensor(s). Each microwave sensor then measures a plurality of points in the scene that is to be measured (leading to a plurality of pixels), thereby making it possible to obtain a number of pixels in the microwave image that is greater than the number of sensors of the imaging device.

The reflector means may be mounted to move in rotation through 360° about a first axis.

The device may include rotary means configured to rotate the reflector means at a speed of rotation greater than or equal to 300 revolutions per minute (rpm), preferably greater than or equal to 450 rpm, and more preferably greater than or equal to 600 rpm.

The reflector means may be mounted to move in rotation about a second axis, e.g. perpendicular to the first axis. The various degrees of freedom of the reflector means enable the detection zone of each sensor to be caused to scan a larger area of the scene that is to be measured. This makes it possible to further reduce the number of sensors or else to increase the area of the scene that is measured.

The imaging device may include a first set of microwave sensors arranged in a line so that the measurement zones corresponding to said first set of microwave sensors are in alignment, for example, parallel to the first axis of rotation of the reflector means, so as to be moved by rotating the reflector means about the first axis. In this embodiment, the reflector means enable the scene that is to be measured to be scanned with a line of detection zones: when the line measures the width of the scene that is to measured, it then suffices merely for the measurement means to move that line over the entire height of the scene that is to be measured in order to obtain a complete image.

The reflector means may present an area that is greater than or equal to 0.1 square meters ($m^2$), preferably greater than or equal to 0.3 $m^2$, and more preferably greater than or equal to 0.4 $m^2$.

The reflector means may be mounted in a cylinder that is transparent to the electromagnetic radiation that can be picked up by the microwave sensor(s). The use of reflector means, e.g. a mirror, mounted in a cylinder that is transparent to the radiation enables the reflector means to be moved, and more particularly to be rotated, at high speed while limiting disturbances, in particular movements of air, sound noise, and vibration due to the rotation. A device is thus obtained that is more stable and more reliable, while presenting a high scanning speed, e.g. 450 rpm.

The axis of the cylinder may be mounted on the first axis.

The reflector means may be plane and the first axis may extend in the plane of the reflector means.

The imaging device may also include one or more reference emitter means, for example, two reference emitter means, and the reflector means may be configured also to move the detection zone of each microwave sensor over each of the reference emitter means. In order to calibrate the sensors, known references are positioned in the zone scanned by the reflector means. Thus, while scanning the scene that is to be measured, the sensors also scan the two references, thereby enabling each sensor to be adjusted on each scan, e.g. enabling its gain and noise factor to be adjusted.

The emitter means may be stationary. More precisely, the emitter means may be stationary relative to the first microwave sensor or to the set of microwave sensors. It is thus only the reflector means that are movable relative to the first sensor or to the set of sensors.

The reflector means may comprise a plane having two reflecting faces. In this embodiment, one complete rotation of the reflector means about the axis enables the scene that is to be measured to be scanned twice: once by each reflecting face. For a given speed of rotation of the reflector means, this doubles the number of measurements taken by each sensor, which measurements can then be averaged in order to improve the signal-to-noise ratio in the final image.

The imaging device may include a second microwave sensor or set of microwave sensors, for example, radiometric sensors, mounted facing the first microwave sensor or set of microwave sensors. The reflector means may be mounted between the first microwave sensor or set of microwave sensors and the second microwave sensor or set of microwave sensors, and are movable in the detection zone of each microwave sensor so as to move said detection zone by movement of the reflector means.

The second sensor or set of sensors enables a second series of measurements to be taken while using the same reflector means as the first sensor or set of sensors, and without reducing the zone scanned by the first sensor or set of sensors. It is thus possible to double the number of measurements taken of a given scene, and consequently to improve the signal-to-noise ratio in the final image.

In another aspect, there is also provided a microwave imaging method, and for example, a radiometric imaging method, comprising:
  a first microwave sensor or set of microwave sensors, preferably radiometric sensors, each microwave sensor being configured to pick up electromagnetic radiation emitted or reflected by bodies or objects situated in a detection zone of said microwave sensor; and
  reflector means configured to reflect the microwave radiation that can be picked up by the first microwave sensor or set of microwave sensors and mounted to move in the detection zone of each microwave sensor;
wherein the reflector means are moved in such a manner as to move said detection zone without moving the first microwave sensor or set of microwave sensors.

The reflector means may be mounted to move in rotation through 360° about a first axis and the reflector means are rotated through 360° about the first axis in order to move said detection zone.

The reflector means may be mounted in a cylinder that is transparent to the electromagnetic radiation that can be picked up by the microwave sensor(s) and the transparent cylinder may be caused to rotate about its axis in order to move said detection zone.

The axis of the cylinder may be mounted along the first axis.

The reflector means may be plane, and the first axis may extend in the plane of the reflector means.

The detection zone of each microwave sensor may be moved successively over a body or objects and over one or more reference emitter means, preferably two reference emitter means.

BRIEF DESCRIPTION OF THE DRAWINGS

The disclosure and its advantages can be better understood on reading the following detailed description of four particular embodiments given as non-limiting examples and illustrated by the accompanying drawings, in which.

DETAILED DESCRIPTION OF THE DISCLOSURE

Figure 1:
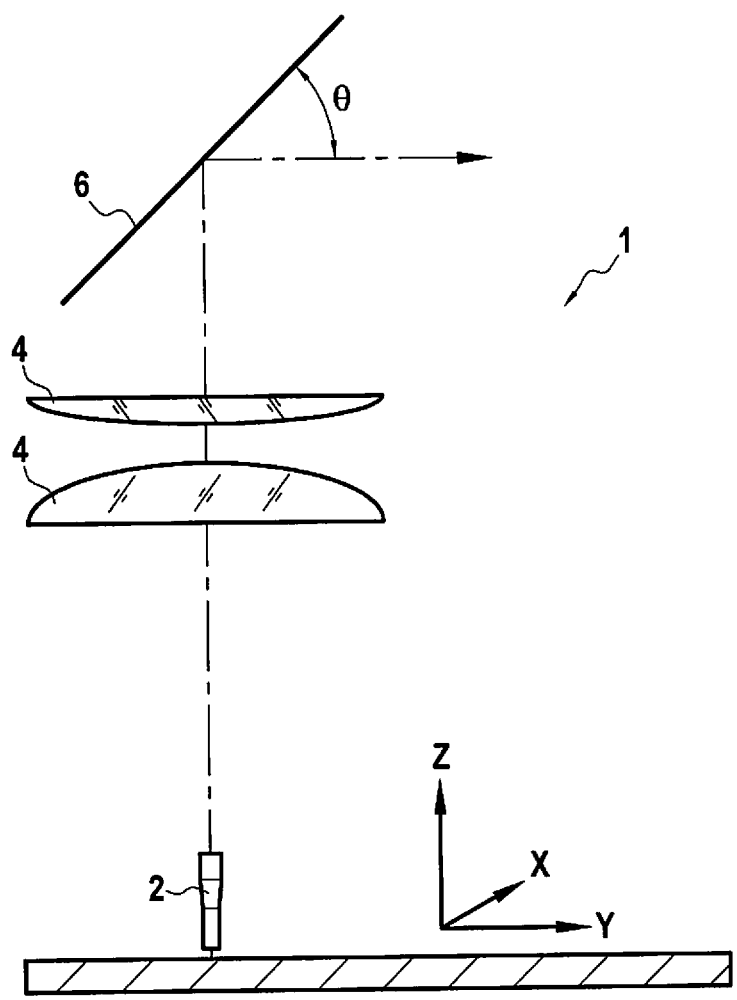
FIG. 1 is a side view of a first embodiment of a device of the disclosure.

FIG. 1 is a diagrammatic side view showing a first embodiment of an imaging device 1 of the disclosure.

In this first embodiment, the imaging device 1 comprises a set of microwave sensors 2, each having a detection zone, focusing means 4 enabling the detection zone of each microwave sensor 2 to be focused, and reflector means 6.

The microwave sensor 2 is configured to pick up radiation emitted or reflected by bodies or objects in its detection zone. The microwave sensor 2 may be a sensor that is active or passive. The microwave sensor 2 may be a radiometric sensor, such as a passive radiometric sensor measuring a Gaussian noise signal corresponding to the radiation emitted by bodies at a temperature other zero degrees kelvin. Alternatively, the microwave sensor 2 may be an active sensor in which a signal is emitted towards the body, e.g. a noise signal, in order to increase the sensitivity and/or the accuracy of the measurements taken by the microwave sensor 2. Alternatively, the microwave sensor 2 may be an active sensor in which a known periodic signal is emitted towards the body and in which the microwave sensor determines the amplitude and phase differences of the measured signal relative to the emitted signal.

In the example described below, it is assumed that the microwave sensor 2 is a radiometric sensor or radiometer. The microwave sensor 2 comprises in particular an antenna (not shown) for picking up radiation from the detection zone, and a receiver (not shown) for processing the radiation picked up by the antenna and for delivering a signal representative of said radiation.

Figure 4:
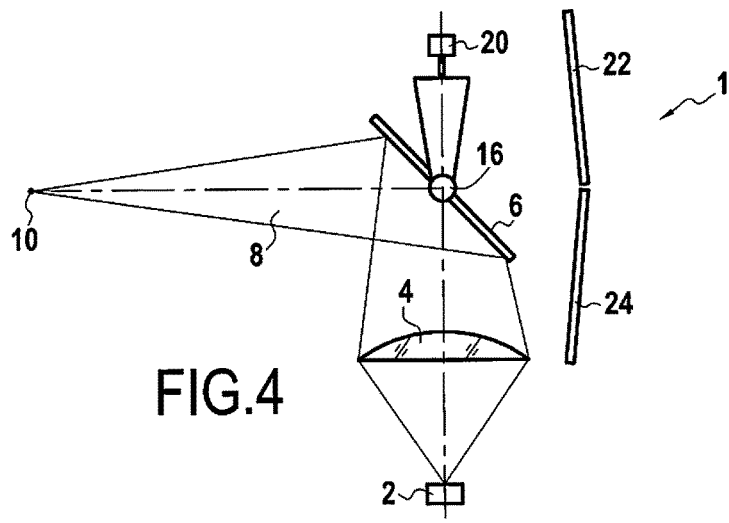
FIG. 4 is a side view of a second embodiment of a device of the disclosure.
Figure 5:
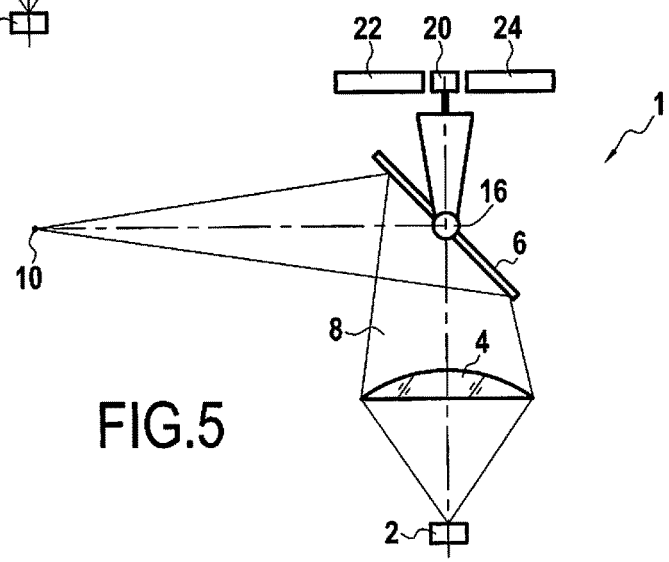
FIG. 5 is a side view of a third embodiment of a device of the disclosure.
Figure 6:
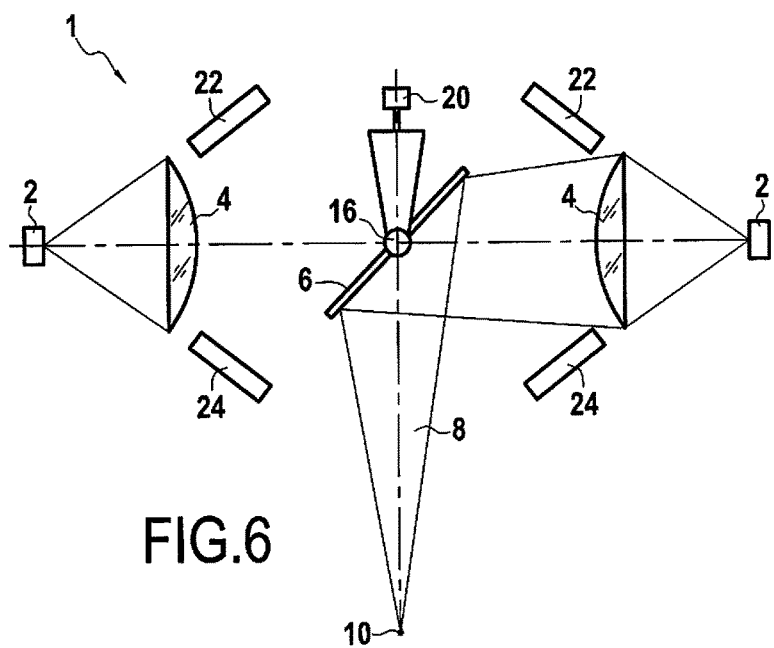
FIG. 6 is a side view of a fourth embodiment of a device of the disclosure.

The set of microwave sensors 2 is associated with focusing means 4. As shown in FIGS. 4 to 6, the focusing means 4 comprise an optical system mounted in the detection zone 8 of each microwave sensor 2 and serving to focus the radiation from a precise zone, referred to as the "measurement" zone 10, towards the corresponding microwave sensor 2. The focusing means 4 may in particular comprise one or more lenses, e.g. converging lens, so as to minimize distortions and improve optical detection by the imaging device 1.

Figure 2:
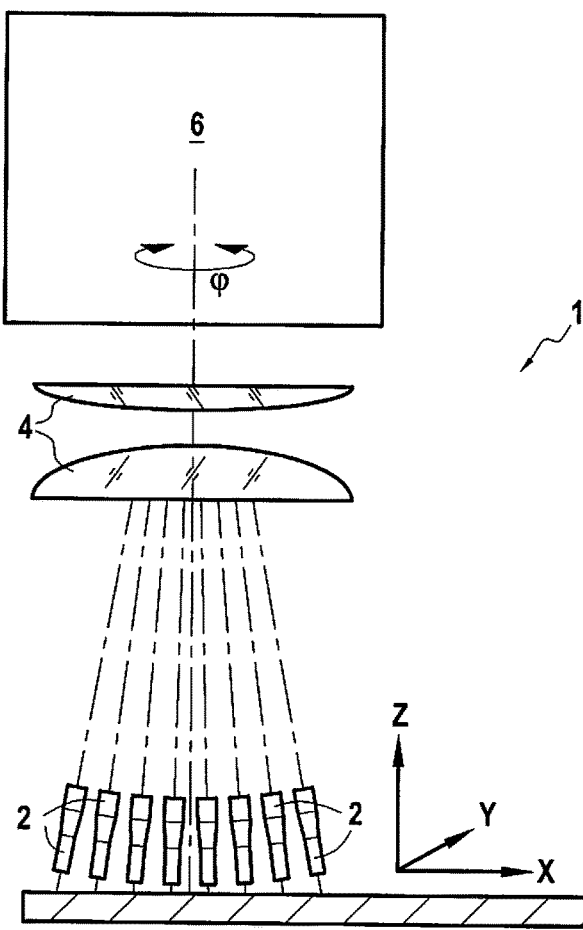
FIG. 2 is a front view of the first embodiment.

With the imaging device 1 shown in FIGS. 1 and 2, the microwave sensors 2 are mounted in line along an axis (axis x in FIGS. 1 and 2) so as to co-operate with the focusing means 4 to form a measurement line constituted by the alignment of the measurement zones 10 of the various sensors 2. More precisely, the microwave sensors 2 are in alignment in a single plane and they are positioned on a circular arc centered on the optical axis of the focusing means 4. Such a configuration makes it possible to obtain the measurement zone 10 of the various sensors 2 in a single plane, referred to as the focal plane, corresponding to the plane of the scene to be measured. Furthermore, each sensor 2 may also be pointed in specific manner by turning about the axis y, so as to obtain appropriate focusing for each sensor 2, regardless of the orientation that may be taken by the reflector means 6.

The reflector means 6 comprise an element with a high reflection coefficient serving to reflect the radiation detected by the microwave sensors 2, e.g. a mirror. In order to enable the scene that is to be measured to be scanned by the measurement zone 10 of the various microwave sensors 2, the reflector means 6 are mounted in the detection zone 8 of the various microwave sensors 2 to pivot with one or more degrees of freedom depending on the surface of the scene to be scanned.

In the present example, the reflector means 6 are plane. Furthermore, the reflector means 6 are mounted to be movable in rotation about an axis extending along the direction x, i.e. parallel to the alignment of the sensors 2. Furthermore, the axis of rotation of these reflector means 6 subdivides them into two substantially equal portions. The angle between the reflector means 6 at a given instant t and a reference position of the reflector means 6 is written θ(t).

Rotating the reflector means 6 about the axis x makes it possible to move the measurement line of the microwave sensors 2 in a direction perpendicular to said line. Assuming that the axis z is vertical while the axes x and y are horizontal, the measurement line formed by the alignment of the measurement zone 10 of the sensors 2 thus extends along the axis x, and rotating the reflector means 6 about the axis x serves to move said measurement line vertically, i.e. in the direction z. When the length of the measurement line corresponds to the width of the scene that is to be measured, this makes it possible to scan all of the scene to be measured by rotating the reflector means 6 so as to move the measurement line from its bottom end to its top end: this makes it easy and quick to obtain "downward" scanning of the scene, by rotating the reflector means 6.

The reflector means 6 can thus rotate continuously through 360° so as to scan the scene that is to be measured. Furthermore, with reflector means 6 having two reflecting faces (e.g. two mirrors), it is possible to scan the scene twice on rotating the reflector means 6 through 360°. Multiple scans of the scene make it possible to obtain a plurality of measurements for each point in the scene, and these measurements can be averaged in order to improve the signal-to-noise ratio: thus, N scans make it possible to improve sensitivity by $N^{1/2}$.

Furthermore, and as shown in FIG. 2, the reflector means 6 may also be movable in rotation about a second axis, for example, an axis perpendicular to the first. Thus, the reflector means 6 of the imaging device 1 may be movable in rotation about an axis passing through the geometrical center of the reflector means 6 (and extending along the direction z). The angle between the reflector means 6 at a given instant t and a reference position is written φ(t).

Turning the reflector means 6 about the axis z enables the measurement line of the microwave sensors 2 to be moved along said line. By considering the axis z as being vertical and the axes x and y as being horizontal, the measurement line formed by the alignment of the measurement zones 10 of the sensors 2 extends along the axis x, and turning the reflector means 6 about the axis z enables said measurement line to be moved along the axis x. It is thus possible to scan a scene that is wider than the length of the measurement line by performing a vertical scan (rotation about the axis x) for different values of φ, or alternatively to scan horizontally for different values of θ. It is thus possible to scan an entire scene that is wider than the measurement line.

Alternatively, the measurement line may be formed by a discontinuous alignment of the measurement zone 10 of the various sensors. Under such circumstances, turning the reflector means 6 about the axis z can serve to measure scene portions situated between the measurement zones 10 in the measurement line. More particularly, by moving the reflector means about the axis z so as to measure the gap in the scene situated between two adjacent measurement zones 10, it is possible to measure the width of the scene without redundancy between the various measurements taken by the various sensors 2.

Nevertheless, the imaging device 1 of the disclosure is not limited to such reflector means 6, and could equally involve reflector means of some other shape, e.g. spherical, mounted to move about an axis situated at one end of the reflector means, for example.

Figure 3:
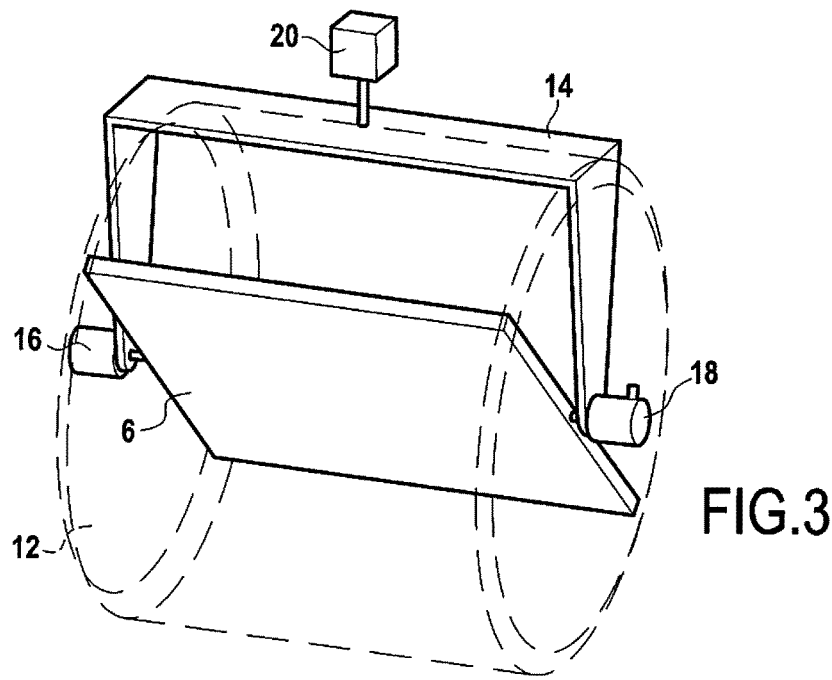
FIG. 3 is a perspective view of a reflector element fitted to the devices of the disclosure.

FIG. 3 shows an example of reflector means 6 of the disclosure. In particular, the reflector means 6 in this example comprise a plane mirror that is mounted in a cylinder 12 that is transparent to the radiation measured by the sensors 2 and that has a surface that serves to limit losses by reflection and/or transmission of the radiation measured by the sensors so that the cylinder 12 is invisible for the sensors 2. By way of example, the cylinder 12 may be made of a material presenting a dielectric constant that is small, close to 1. By way of example, the reflector means 2 may be mounted in the cylinder 12 on a plane of symmetry containing the axis of the cylinder 12. The axis of rotation x of the reflector means 6 may coincide with the axis of the cylinder 12. The reflector means 6 may be rectangular in shape, having a width of 60 cm and a length of 70 cm, giving an area of 0.42 m². Such an area, when set into rotation, moves a large amount of air around it, thus requiring a more powerful motor, and also requiring measurements taken by the sensors to be corrected, while also giving rise to a very large amount of audible noise: using a cylinder around the plane reflector means enables such movements of air to be limited.

By way of example, the cylinder 12 may be solid, made of dielectric material such as expanded polyethylene presenting a dielectric constant $\varepsilon_r$ equal to 1.05. Alternatively, the cylinder 12 may be hollow and formed by a plastic film held by ribs surrounding the reflector means 2 and imparting a cylindrical shape.

Furthermore, the cylinder 12 is mounted on a frame 14 and is held in the frame 14 along its axis that is mounted to move in rotation. The frame 14 also has a drive motor 16, e.g. a continuously operating motor for rotating the cylinder 12 (and thus the reflector means 6) at a constant, high speed, and it also has a code wheel 18 for delivering at each instant the angle θ of the reflector means 6 relative to the reference position.

With such a configuration, it becomes possible to rotate the reflector means 6 rapidly, while limiting noise due to movements of air and vibration: from a microwave point of view, the reflector means 6 mounted in the cylinder 12 behave like rotating reflector means while forming a uniform and balanced unit, thereby improving the speed and the quality of the measurements taken by the sensors 2, in particular in terms of spatial resolution and sensitivity. In particular, it is possible to perform vertical scanning very quickly, or indeed to perform a plurality of vertical scans of a given scene several times in succession so as to be able to average the values obtained, thereby obtaining a better signal-to-noise ratio in the final image. By way of example, the motor 16 may deliver 450 rpm (i.e. 7.5 revolutions per second).

The frame 14 may also be mounted to move in rotation, e.g. relative to the axis z by means of a motor 20. The motor 20, which by way of example may be a stepper motor, serves to steer the reflector means 6 by determining the angle φ between the reflector means and a reference position. The motor 20 does not need to operate continuously, and on the contrary is selected to be a stepper motor so as to enable the scene to be scanned vertically at each angle φ.

FIG. 4 shows a second embodiment of the disclosure in which references identical to those of FIG. 1 designate the same elements. FIG. 4 shows an imaging device 1 that also has reference emitter means 22, 24.

Specifically, one of the main problems of microwave sensors relates to their stability over time in terms of gain and/or noise factor. These instabilities arise from temperature variations and/or low frequency noise of bias circuits. In a device having a plurality of microwave sensors, it is therefore important to be able to normalize the response of all of the sensors in terms of gain and noise factor, e.g. by using reference emitter means. In particular, correcting both gain and noise factor makes it necessary to use two references.

Thus, the reference emitter means 22 and 24 are configured to enable the various sensors 2 to be calibrated in situ. The reference emitter means 22 and 24 may be made of absorbent materials that are temperature regulated at two different temperatures. The reference means 22, 24 may also be of a size that enables them to be in the measurement or detection zone 10 of all of the sensors 2: under such circumstances, for a given position of the reflector means 6, it is possible to know that all of the sensors 2 are measuring the same radiation, and consequently to calibrate the values obtained by the various sensors 2.

More precisely, the reference emitter means 22, 24 are arranged in the scan field of the reflector means 6: this implies reducing the size of the scene that can be scanned by the reflector means 6, but makes it possible on each rotation of the reflector means 6 to scan in succession the scene that is to be measured and at least one of the reference emitter means 22, 24.

In the example shown in FIG. 4, the reference emitter means 22, 24 are arranged in a direction that is opposite from the direction of the scene that is to be measured. On each half-revolution of the reflector means, the sensors 2 measure the value of the scene that is to be measured followed by one or more reference radiations serving to normalize the values measured for the scene on that half-revolution. Such an imaging device 1 performs regular and systematic calibration without needing an additional motor and without wasting time.

FIG. 5 shows a third embodiment of the disclosure in which references identical to FIG. 1 designate the same elements. FIG. 5 shows an imaging device 1 in which the reference emitter means 22 and 24 are positioned facing the sensors 2 with the reflector means 6 being positioned between the sensors 2 and the reference emitter means 22 and 24. Such an embodiment makes it possible, when positioned vertically, specifically to scan two different scenes: a scene on the left of the imaging device 1 and a scene on the right. This embodiment may in particular be positioned in a passage along which people pass in order to scan said people successively from in front and from behind.

FIG. 6 shows a fourth embodiment of the disclosure in which references identical to those of FIG. 1 designate the same elements. FIG. 6 shows an imaging device 1 having a second set of microwave sensors 2 mounted facing the first set of microwave sensors 2, with the reflector means 6 being positioned between the two sets and with a second pair of reference emitter means 22, 24. Each pair of reference emitter means 22, 24 is arranged in the scan field of one of the sets of sensors 2. Such an embodiment makes it possible using single reflector means 6 to obtain two images of the same scene measured by two sets of sensors 2, while also being capable of scanning two scenes at the same time: a scene above and a scene below. It is thus possible to increase the sensitivity of the final image by a factor of $2^{1/2}$ by averaging the values. Alternatively, the time required for performing a scan can be divided by two.

Nevertheless, for each set of sensors 2, there is to be found a corresponding pair of reference emitter means for calibrating the corresponding sensors 2.

Thus, with the imaging device of the disclosure, it becomes possible in reliable and high-performance manner to scan scenes rapidly and to do so with measurements that are calibrated, while using an imaging device that has a limited number of sensors. The use of a cylinder serves in particular to limit the disturbances that might be created by rapidly rotating the reflector means. Furthermore, using reference emitter means that are scanned systematically enables the sensors to be calibrated automatically and effectively without delaying measurements of the scene. Finally, the disclosure makes it possible to undertake multiple scans of one or more scenes quickly, thus making it possible, by averaging the values, to further improve the sensitivity of the results, and thus their quality.

The invention claimed is:

1. An imaging device comprising:
   a first set of microwave sensors, each microwave sensor being configured to pick up electromagnetic radiation emitted or reflected by bodies or objects situated in a detection zone of said microwave sensor; and
   a reflector configured to reflect the electromagnetic radiation that can be picked up by the first set of microwave sensors;
   one or more reference emitters,
      wherein the reflector is mounted to be movable in the detection zone of each microwave sensor so as to move said detection zone by movement of the reflector, and wherein the reflector is configured also to move the detection zone of each microwave sensor successively over a body or object and over one or each of the reference emitters, and wherein the imaging device is configured to calibrate the gain and/or noise factor of each microwave sensor of the first set of microwave sensors from the measurement, by each microwave sensor of the first set of microwave sensors, of the radiation of one or of each of the reference emitters.

2. The imaging device according to claim 1, also including a focusing device mounted in the detection zone of each microwave sensor and configured to enable the electromagnetic radiation from a measurement zone to be focused on each microwave sensor, and wherein the reflector is positioned between the focusing device and the measurement zone of each microwave sensor.

3. The imaging device according to claim 1, wherein the reflector is mounted to move in rotation about a first axis.

4. The imaging device according to claim 1, including rotary device configured to rotate the reflector about a first axis at a speed of rotation greater than or equal to 300 rpm.

5. The imaging device according to claim 3, wherein the reflector is mounted in a cylinder that is transparent to the electromagnetic radiation that can be picked up by the microwave sensor(s).

6. The imaging device according to claim 5, wherein the reflector is plane and wherein the axis of the cylinder is mounted on the first axis and extends in the plane of the reflector.

7. The imaging device according to claim 5, wherein the reflector comprises a plane having two reflecting faces.

8. The imaging device according to claim 7, including a second set of microwave sensors, mounted facing the first set of microwave sensors, and wherein the reflector is mounted between the first set of microwave sensors and the second set of microwave sensors, and is movable in the detection zone of each microwave sensor so as to move said detection zone by movement of the reflector.

9. The imaging device according to claim 4, wherein the reflector is mounted in a cylinder that is transparent to the electromagnetic radiation that can be picked up by the microwave sensor(s).

10. The imaging device according to claim 6, wherein the reflector comprises a plane having two reflecting faces.

11. The imaging device according to claim 1, wherein the first microwave sensor or the set of microwave sensors are radiometric sensors.

12. The imaging device according to claim 1, comprising two reference emitters.

13. The imaging device according to claim 3, wherein the first axis is a horizontal axis.

14. The imaging device according to claim 3, wherein the reflector is mounted to move in rotation about a second axis.

15. The imaging device according to claim 6, wherein the second axis is perpendicular to the first axis.

16. An imaging device comprising:
    a first set of microwave sensors, each microwave sensor being configured to pick up electromagnetic radiation emitted or reflected by bodies or objects situated in a detection zone of said microwave sensor; and
    a reflector configured to reflect the electromagnetic radiation that can be picked up by the first microwave sensor or the set of microwave sensors;
    wherein the reflector is mounted to be movable in the detection zone of each microwave sensor so as to move said detection zone by movement of the reflector and wherein the reflector is mounted in a rotative cylinder that is transparent to the electromagnetic radiation that can be picked up by the microwave sensors.

17. The imaging device according to claim 12, wherein the two reference emitters are made of absorbent materials that are temperature regulated at two different temperatures.

* * * * *